United States Patent [19]
Lin

[11] Patent Number: 5,797,617
[45] Date of Patent: Aug. 25, 1998

[54] LUGGAGE SYSTEM AND FOLDING DOLLY THEREFOR

[76] Inventor: Shiou Chang Lin, 207 S. Second Ave., Arcadia, Calif. 91006

[21] Appl. No.: 582,921

[22] Filed: Jan. 4, 1996

[51] Int. Cl.$^6$ .................................................. B62B 1/14
[52] U.S. Cl. .................. 280/655; 280/47.29; 280/37; 190/18 A
[58] Field of Search .................. 280/37, 47.17, 280/47.24, 47.27, 47.29, 47.315, 639, 655, 645, 654; 190/18 R, 18 A

[56] References Cited

U.S. PATENT DOCUMENTS

| | | | |
|---|---|---|---|
| 4,221,402 | 9/1980 | Kazmark | 280/655 |
| 4,523,773 | 6/1985 | Holtz | 280/47.29 |
| 5,024,458 | 6/1991 | Kazmark et al. | 280/47.29 |
| 5,368,143 | 11/1994 | Pond et al. | 190/18 A |
| 5,374,073 | 12/1994 | Hung-Hsin | 190/18 A |
| 5,385,220 | 1/1995 | Pond et al. | 280/37 |
| 5,421,605 | 6/1995 | Chen | 280/47.29 |
| 5,452,778 | 9/1995 | Wang | 280/37 |
| 5,549,318 | 8/1996 | Ho | 280/47.27 |

*Primary Examiner*—Brian L. Johnson
*Assistant Examiner*—Min Yu
*Attorney, Agent, or Firm*—Sheldon & Mak

[57] ABSTRACT

A luggage system including a plurality of luggage pieces has a dolly connector unit including a latch plate member fixably located on each of the luggage pieces; and a dolly including a wheeled base. A handle frame including a parallel spaced pair of telescoping columns of first through last column members projecting from the base. A handle member being rigidly connected between the last column members of the columns for manipulation of the dolly. A platform is pivotally connected to the base on a platform axis proximate the handle frame and having an extended position perpendicular to the handle frame and a retracted position parallel to and proximate the handle frame, a support for contacting the roadway surface in the extended position of the platform for providing a rest position of the dolly wherein the platform is fixed parallel to the roadway surface with the wheels also contacting the roadway surface, the dolly also having an inclined transport position with the wheels rollably supporting the dolly. The dolly also has a luggage connector unit supported on the handle frame for coupling the dolly connector units, at least one luggage piece being supportable partly on the platform and partly by the handle frame when the luggage connector unit is coupled to the corresponding dolly connector unit.

17 Claims, 3 Drawing Sheets

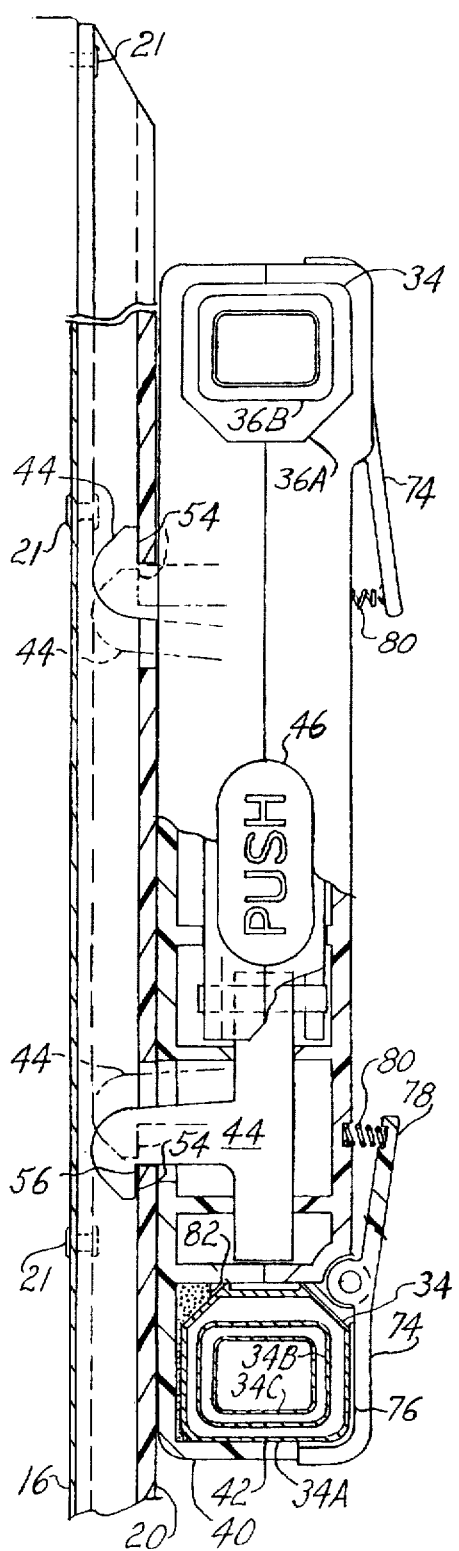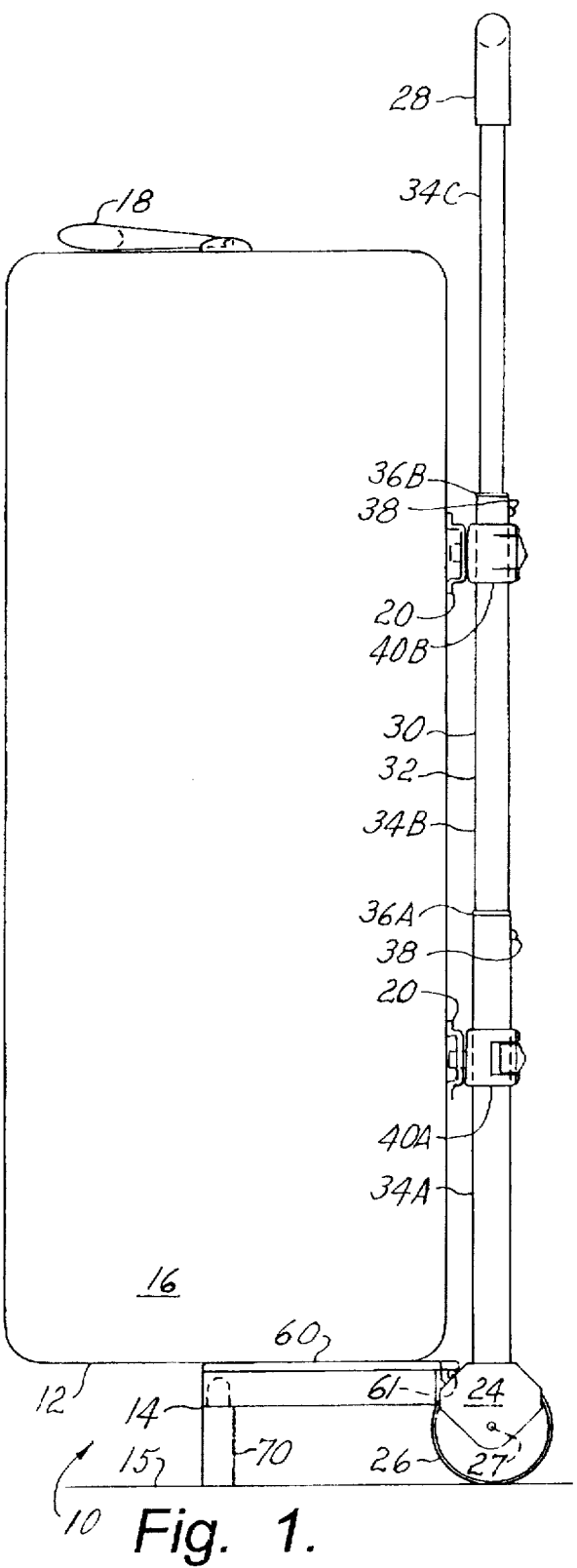
Fig. 2.
Fig. 1.

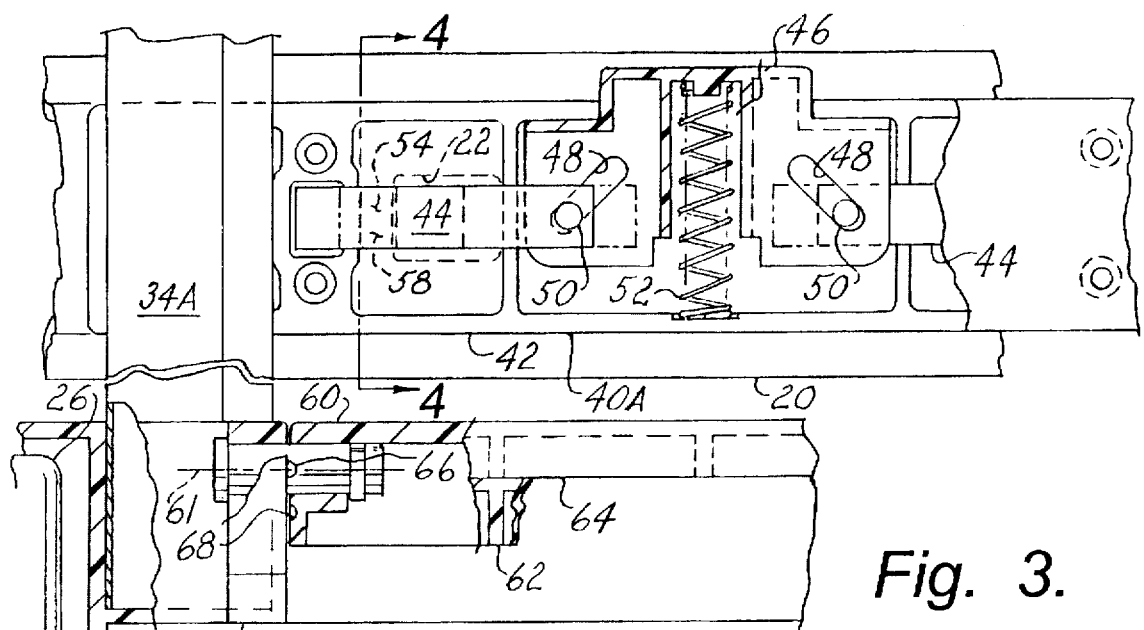
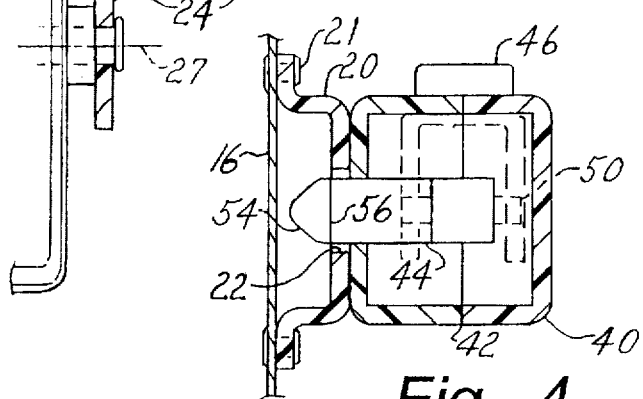
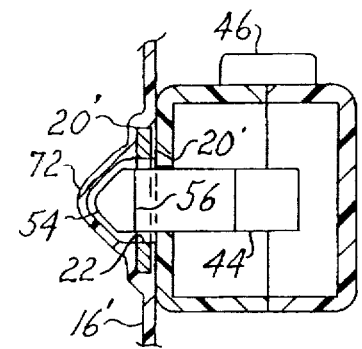
Fig. 4.  Fig. 8.
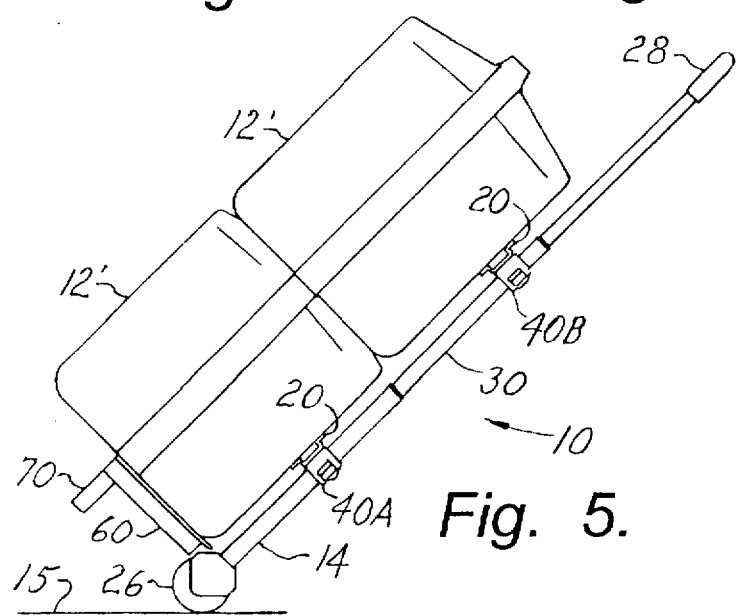
Fig. 5.

5,797,617

LUGGAGE SYSTEM AND FOLDING DOLLY THEREFOR

BACKGROUND

The present invention relates to containers such as for luggage and the like, and to wheel devices for transporting same.

Dollies and other vehicles for transporting luggage and the like are commonly known, both for single and multiple articles of luggage. The problems associated with such devices include the luggage being subject to inadvertent falling or other undesired separation from the devices and, when the luggage is intentionally separated, the devices are awkward to store. It is also known to provide luggage with wheels permanently installed, and a tethered handle for pulling the luggage along without having to stoop over. However, the addition of wheels to each article of luggage is undesirably expensive and wasteful of space. Also, the wheels are typically made small in mitigation of the wasted space; consequently, the wheels are ineffective for traversing many commonly encountered obstacles. Further, the luggage is particularly subject to tipping over when pulled along by the tethered handle, especially when the luggage is tall and the wheels are small and/or closely spaced. Moreover, each such article is required to be pulled separately, the transport of several such articles of luggage being especially cumbersome.

Thus there is a need for luggage that is transportable on wheels, but without the disadvantages of the prior art.

SUMMARY

The present invention meets this need by providing a luggage system that includes a dolly removably connectable thereto. In one aspect of the invention, a luggage system includes a luggage piece having a first connector element fixably located thereon, and a wheeled dolly having a second connector element supported thereon, the second connector element being selectively engagable with the first connector element for securing the luggage piece relative to the platform for transport thereon. The dolly connector unit can include a rigid latch plate member having a latch plate opening therein, the luggage connector unit including a latch member that is insertable into the latch plate opening during coupling of the connector units. The latch plate member is preferably mounted with at least a catch portion of the latch plate extending from the opening opposite the luggage connector unit in spaced relation to adjacent structure of the luggage piece for permitting free entry of the latch member into the opening with hook engagement against the catch portion.

The luggage connector unit can include a latch frame member connected to the base and movably supporting the latch member between open and closed positions, the latch member having a catch portion. In the open position the latch member is insertable into the latch plate opening for coupling the connector units, the catch portion holding the latch plate member proximate the latch frame member in the closed position of the latch member. The latch member can be one of an oppositely disposed pair of latch members. The latch plate opening can be one of a pair of latch plate openings, the latch members in the open position being insertable into the respective latch plate openings. Preferably the luggage latch unit also has a latch actuator for simultaneous movement of the latch members between the open and closed positions thereof, and a biasing element for biasing the latch members toward the closed position.

The dolly can also include a pair of axially spaced wheels rotatably mounted to the base for rolling the dolly over a roadway surface, a handle frame connected between the base and the handle and supporting the luggage connector, and a support member for (together with the wheels) supporting the base with the dolly in a rest position, the platform being fixed parallel to the roadway surface, the handle frame extending perpendicular to the platform, the dolly also having a transport position wherein the platform and the handle frame are together inclined relative to the rest position, the support member being raised from the roadway surface with the wheels rollably supporting the dolly, the luggage piece being supportable partly on the platform and partly by the handle frame when the connector units are coupled together.

Preferably the platform is pivotally connected to the base proximate the handle frame for facilitating transport and storage of the dolly apart from luggage pieces, the platform being movable between an extended position perpendicular to the handle frame and a retracted position approximately parallel to the handle frame, the support member being connected to the platform in spaced relation to the handle frame, the platform being in the extended position in the rest and transport positions of the dolly. Preferably the support member includes a foldable leg member having a deployed position perpendicular to the platform (in the rest and transport positions of the dolly) and a retracted position parallel to the platform, the dolly also having a storage configuration wherein the platform and the leg member are in the respective retracted positions.

Preferably the handle frame includes a plurality of telescoping members for selectively locating the handle between extended and retracted positions relative to the base. The telescoping members can form a parallel spaced pair of frame columns, the luggage connector being connected between corresponding members of each column. The luggage connector unit can be a first luggage connector connected between first column members of the handle frame, the dolly preferably also having a second luggage connector connected between respective second column members of each column. When the luggage piece is large, the dolly connector unit can be a first dolly connector for connection with the first luggage connector, the luggage piece preferably including a second dolly connector for connection to the second luggage connector. When used with smaller luggage pieces, the luggage piece can be a first luggage piece, and a second luggage piece having a counterpart of the dolly connector unit of the first luggage piece can be stackable with the first luggage piece on the platform with respective ones of the dolly connector units releasably engaging the first and second luggage connectors. The luggage piece can be a selected one of a plurality of luggage pieces, at least some of the pieces having the dolly connector differently located thereon, the luggage connector being adjustably locatable relative to the platform for alignment with the dolly connector of the selected luggage piece. Preferably the system includes a latch holder for releasably fixably holding the luggage connector on at least one of the column members. The latch holder can include a pair of arm members pivotally connected to the latch frame, each arm member having a grip element for contacting a respective one of the column members, and a handle portion for moving the grip element away from the column member in response to finger pressure, a spring element being connected between the arm member and the frame for biasing the brake element against the column member.

In another aspect, the invention provides a dolly for use with luggage pieces having dolly connector units. In a further aspect, the invention provides luggage pieces having dolly connector units for use with the dollies.

DRAWINGS

These and other features, aspects, and advantages of the present invention will become better understood with reference to the following description, appended claims, and accompanying drawings, where:

FIG. 1 is a side elevational view of a luggage system including a luggage article and a wheeled dolly connected thereto according to the present invention, the dolly being in a rest position;

FIG. 2 is a fragmentary sectional plan view of a portion of the system of FIG. 1;

FIG. 3 is a fragmentary sectional elevational view of the system portion of FIG. 2;

FIG. 4 is a side elevational sectional detail view of the system of FIG. 1 on line 4—4 in FIG. 3;

FIG. 5 is a side elevational view showing an alternative configuration of the system of FIG. 1, the dolly being in a transporting position;

FIG. 8 is a sectional detail view as in FIG. 4, showing another alternative configuration of the system portion of FIG. 2.

DESCRIPTION

Figure 7:
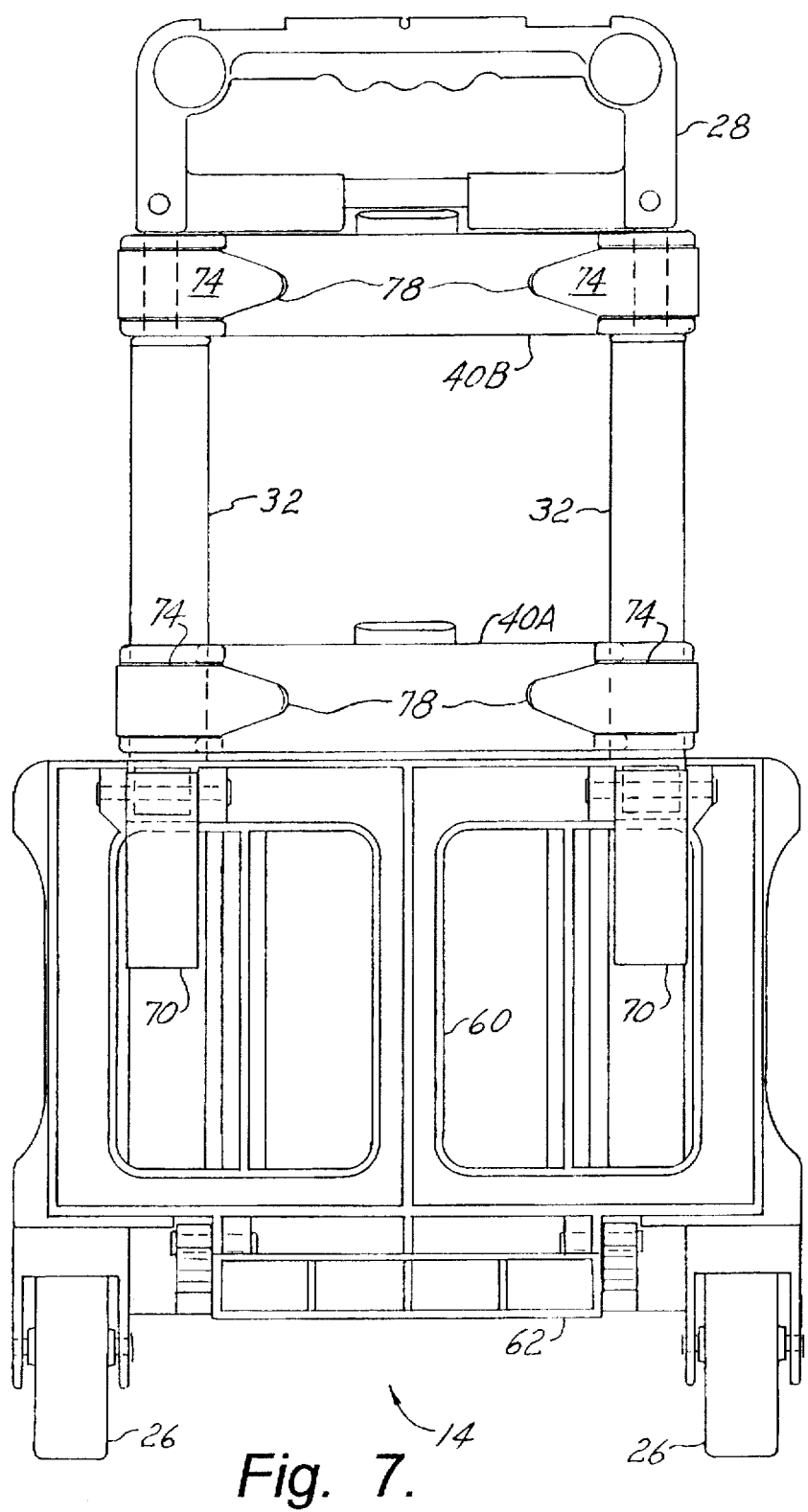
FIG. 7 is a rear elevational view of the dolly of FIG. 5.

The present invention is directed to a luggage system that facilitates secure wheeled transport of luggage while conserving space. With reference to FIGS. 1–5 of the drawings, a luggage system 10 has a luggage piece 12 (which is typically one of a plurality of such pieces that can be variously sized and configured) and a dolly 14 that is adapted for transporting the luggage piece 12 over a roadway surface 15 with the piece 12 being latched in place according to the present invention. The luggage piece 12 includes a container 16 which can be of conventional construction, typically including a luggage handle 18 as shown in FIG. 1. In an exemplary configuration of the system 10, a latch channel member 20 having a hat-shaped cross section is fixedly attached to the container 16 by suitable fasteners 21. A pair of latch plate openings 22 are formed in a web portion of the channel member 20 in spaced relation to the container 16, the channel member 20 being releasably connectable to the dolly 14 and forming a dolly connector unit as described below for securing the luggage piece 12 in place.

The dolly 14 includes a base 24, a pair of axially disposed wheels 26 being rotatably mounted to the base 24 on a wheel axis 27 for rollably supporting the luggage piece 12 and the dolly 14 on the roadway surface. A dolly handle 28 is connected by a handle frame 30 to the base for manipulation of the dolly 14, the frame 30 including a parallel spaced pair of telescoping column assemblies 32, each column assembly 32 having a first column member 34A, a second column member 34B, and a third column member 34C (being sometimes collectively referred to as 34), the first column members 34A being rigidly connected to the base 24 perpendicular to the wheel axis 27 and in proximate alignment therewith, the third (last) column members 34C being rigidly connected to opposite sides of the dolly handle 28 for permitting the dolly handle 28 to be positioned in respective extended and retracted positions relative to the base 24. In each column assembly 32, a first bushing 36A fixedly extends within the first column member 34A for axially guiding the second column member 34B, and a second bushing 36B fixedly extends within the second column member 34B for axially guiding the third column member 34C. Preferably, the column members 34 (and the bushings 36) are non-circularly cylindrical for preventing relative rotation of the column members 34 of each column assembly 32, thereby stiffening the handle frame 30 against twisting. The handle frame 30 is also provided with button latches 38 or other suitable means for selectively holding the columns 32 in the extended position.

An important feature of the present invention is that the dolly 14 is equipped with at least one luggage latch unit 40, respective first and second latch units 40A and 40B being shown in the drawings, for selectively coupling the latch channel member 20 of luggage pieces 12 that may be loaded onto the dolly 14, whereby the pieces 12 are securely held in place on the dolly 14 during transport thereof. The first latch unit 40A extends between the first column members 34A, having axial engagement therewith for selectively spacing the unit 40A relative to the base 24 for engagement with the latch channel member 20 as further described below. Similarly, the second luggage latch unit 40B extends between the second column members 34B, the first latch unit being located between the second latch unit and the base.

Each latch unit 40 includes a latch frame 42 that engages the corresponding column members 34, a pair of latch members 44 being slidably supported in the frame 42 for movement between respective latching and unlatching positions, the latching position being depicted by solid lines in the drawings, the unlatching position by broken lines in FIGS. 2 and 3. A latch button 46 is slidably supported within the latch frame 42 between the latch members 44 and having respective ramp slots 48 formed thereon for slidably engaging corresponding boss portions 50 of each latch member 44 to effect complementary movement thereof between the latched and unlatched positions in response to movement of the latch button 46, a latch spring 52 being interposed between the button 46 and the frame 42 for biasing the latch members 44 to the latched position.

In the unlatching position, respective hook portions 54 the latch members 44 are insertable through corresponding ones of the latch plate openings 22 that are formed in the latch channel member 20, the insertion being facilitated by smoothly sloping contours that are formed on the hook portions 54 for guiding the luggage latch unit 40 into coupling engagement with the channel member 20. With the channel member 20 resting against the latch frame 42 and the latch button 46 being released, the latch spring 52 is effective for moving the latch members 44 to the latching position, respective hook shoulders 56 that are formed on the hook portions 54 of the latch members 44 engaging corresponding catch surfaces 58 of the channel member 20 opposite the frame 42, thereby securing the latch channel member 20 to the luggage connector unit 40. When the latch members 44 are held in the releasing position by depressing the latch button 46, the hook portions 54 of the latch members 44 can freely enter and exit the latch plate openings 22. It will be understood that the positions of the channel member 20 and the latch unit 40 can be reversed within the scope of the present invention, there being respective latch units on the luggage piece 12 and the dolly 14 that are selectively coupleable for fixably holding the piece 12 in place on the dolly 14.

Figure 6:
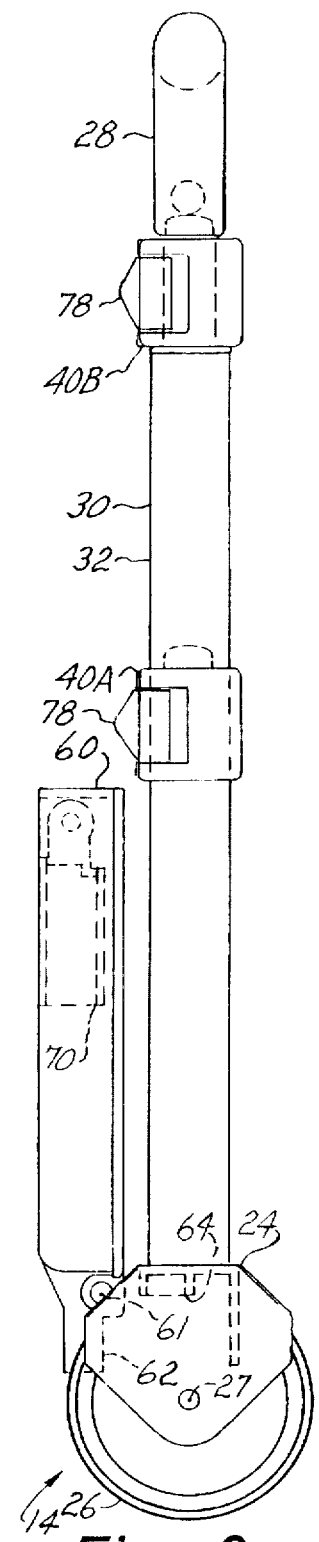
FIG. 6 is a side elevational view showing a dolly portion of the system of FIG. 1 in a folded condition.

As further shown in the drawings, a platform member 60 is pivotally mounted to the base 24 on a platform axis 61, the platform axis 61 being located parallel to the wheel axis 27 proximate the handle frame 30. The platform member 60 is movable from an extended position that is generally perpendicular to the frame 30 as shown in FIGS. 1 and 3, to a retracted position that is generally parallel to and proximate the frame 30 as shown in FIGS. 6 and 7. In the extended position, the platform member 60 is adapted for supporting the luggage piece 12, a tab portion 62 of the member 60 extending between the columns 32 of the handle frame 30 and engaging a stop surface 64 of the base 24 for preventing movement of the platform member 60 beyond the extended position. At each side of the platform member 60, the base 24 has a detent button 66 for engaging a pair of detent cavities 68 that are formed in the platform member 60 in angularly spaced relation about the platform axis 61 for releasably holding the platform member 60 in each of the extended and folded positions thereof.

A pair of leg members 70 are mounted to the platform member 60 in spaced relation to the platform axis 61 for supporting the dolly 14 in a rest position as shown in FIG. 1 with the leg members 70 and the wheels 26 contacting the roadway surface 15, the platform member 60 being supported parallel to the roadway surface 15. Preferably the leg members 70 are pivotally mounted, being movable between an extended position as shown in FIG. 1 for support of the platform member 60, and a retracted position as shown in FIGS. 6 and 7. The leg members 70 advantageously retract inside of the platform member 60, so that when the platform member 60 is in the folded position of FIGS. 6 and 7, the handle frame 30 also being in the retracted position thereof, the dolly 14 has a compact side profile that facilitates storage and transport of the dolly 14 separate from the luggage piece 14.

Each of the latch units 40 is adjustably positionable on the handle frame 30 relative to the extended position of the platform 60, for engagement with variously sized ones of the luggage pieces 12. In the exemplary configuration as shown in the drawings, a pair of holder arms 74 are pivotally mounted to each latch frame 42 for holding the respective latch units in place on the telescoping columns 32. More particularly, each of the holder arms 74 has a grip element 76 affixed thereto for contacting the associated column member 34, a handle portion 78 of the arm 74 extending in spaced relation to the frame 42 opposite the luggage piece 12 for releasing the grip element 76 from gripping contact with the column member 43, a compression spring 80 being interposed between the handle portion 78 and the frame 42 for biasing the grip element against the column member 34. Thus each latch unit 40 can be positioned as desired on the handle frame 30 while applying thumb pressure against the handle portions 78 of the holder arms 74. The grip elements 76 can be made from a smooth material having a high friction coefficient, a suitable material being adhesive strip foam padding that is commercially available from a variety of sources.

It is contemplated that the latch unit 40A will be, located on the column members 34A exclusively, or on the column members 34A and 34B. Thus the holder arms 74 of the latch unit 40A are operative for gripping the column members 34A and 34B in cooperation with a foam pad 82 that is affixed within the frame 42 opposite the grip elements 76, depending on the location of the latch unit 40A on the handle frame 30. Similarly, the latch unit 40B is locatable on the column members 34B and 34C, the holder arms 74 of the latch unit 40B being formed for holding the grip elements 76 thereof against the column members 34B or 34C in cooperation with a counterpart of the foam pad 82.

As shown in FIG. 5, the dolly 14 can be loaded with a stacked plurality of luggage pieces, designated 12', that are counterparts of the luggage piece 12 of FIG. 1. Each of the luggage pieces 12' is provided with a single one of the latch channel members 20 for coupling with corresponding ones of the luggage latch units 40 of the dolly 14, the latch units 40 being each adjustably positionable relative to the platform member 60 for mating engagement with the respective channel members 20. It will be understood that the luggage pieces 12' can be variously sized, together and/or individually, by virtue of the adjustable positioning of each luggage latch unit 40 relative to the platform member 60. Also, the containers 16 of the luggage pieces 12 and 12' can be rigid and/or soft-sided. In FIG. 5, the dolly 14 is in a transport position that is inclined relative to the rest position of FIG. 1, the luggage pieces 12' being supported partly by the platform member 60 and partly by the latch frames 42 of the luggage latch units 40. In the case of luggage having flexible (cloth) counterparts of the container 16, support of the pieces 12 and/or 12' can be augmented by the handle frame 30 and/or the latch frames 42 directly contacting the containers 16 in the transport position of the dolly 14.

Suitable materials for the column members 34 include extruded aluminum alloy tubing. A suitable material for the wheels 26 is molded Neoprene®. Suitable materials for the latch channel member 20, the base 24, the dolly handle 28, the latch frames 42, the latch members 44, the platform member 60, and the leg members 70, are molded engineering plastics including polyethylene and polyurethane.

With further reference to FIG. 8, an alternative configuration of the luggage piece 12 has a counterpart of the container, designated 16', having a latch plate 20' embedded therein in place of the latch channel member 20, the container 16' having an inwardly projecting dimple 72 formed therein for receiving the hook portion 54 of the latch member 44, the dimple 72 covering the latch plate opening 22.

The luggage system 10 of the present invention provides a convenient and secure way to transport luggage, that is not wasteful of space, and is easy to use as well as inexpensive to provide. It is versatile in that the dolly 14 can transport a single large luggage piece 12 utilizing a spaced pair of coupled latch units 40 for enhanced security, as well as a stacked plurality of luggage pieces 12' in a variety of sizes, shapes, and construction, each of the pieces 12' being secured in place with a corresponding coupled latch unit 40. The luggage pieces 12' in various sizes are securable to the dolly 14 while being supported on the platform member 60 because the latch units 40 are adjustably spaced above the platform member 60.

Although the present invention has been described in considerable detail with reference to certain preferred versions thereof, other versions are possible. For example, the latch channel member(s) can be located on bottom surfaces of the luggage pieces 12 alternatively or in addition to on side and end surfaces thereof. Also, the luggage latch units 40 can be configured with only one movable latch member 44 that works in conjunction with a stationary member, the stationary member being either adjacent to or spaced from the movable latch member. Further, in place of the holder arms 74, the grip elements 76 (or detent elements) can be provided on outwardly projecting slide portions of the latch member 44, the grip elements being released in the unlatching position of the latch members 44. Moreover, the latch units can incorporate magnetic elements. The present invention is not restricted regarding the number of latch units 40, one, two (as shown in the drawings), three, or even four of the latch units 40 being specifically contemplated. For example, it is preferred that medium and larger sized luggage have a pair of the latch channel members 20 or equivalents thereof, the dolly 12 equipped with three of the luggage latch units being utilized for engaging one luggage piece 12 having two of the channel members 20 stacked with one smaller piece having only one of the channel members 20; and two pieces 12 of medium size would engage four of the loggage latch units 40. Therefore, the spirit and scope of the appended claims should not necessarily be limited to the description of the preferred versions contained herein.

What is claimed is:

1. A luggage system comprising a luggage piece having a dolly connector unit fixably located thereon, the dolly connector unit comprising a rigid latch plate member having a latch plate opening therein; and a dolly, the dolly comprising:

(a) a movable base, a platform fixably located relative to the base;

(b) a handle member fixably locatable relative to the base for manipulation thereof;

(c) a luggage connector unit comprising a latch member, the luggage connector unit being supported relative to the base, the luggage connector unit being selectively coupleable with the dolly connector unit for fixably holding the luggage piece on the dolly, the luggage connector unit comprising a latch frame member connected to the base, the latch member being connected to the latch frame member and movable between open and closed positions relative to the latch frame member, the latch member in the open position thereof being insertable into the latch plate opening during coupling of the connector units, the latch member having a hook portion for holding the latch plate member proximate the latch frame member in the closed position of the latch member, at least a portion of the latch member being insertable into the latch plate opening during coupling of the connector units.

2. The luggage system of claim 1, wherein the latch plate member is mounted with at least a catch portion of the latch plate extending from the opening and facing away from the luggage connector unit in spaced relation to adjacent structure of the luggage piece for permitting free entry of a hook portion of the latch member into the opening to engage the catch portion.

3. The luggage system of claim 1, wherein the latch member is one of an oppositely disposed pair of latch members.

4. The luggage system of claim 3, wherein the latch plate opening is one of a pair of latch plate openings, respective ones of the latch members being insertable into the corresponding latch plate opening in the open position of the latch members.

5. The luggage system of claim 3, wherein the luggage latch unit further comprises a latch actuator member movably supported by the latch frame member for simultaneous movement of the latch members between the open and closed positions thereof, and a biasing element for biasing the latch members toward the closed positions thereof.

6. The luggage system of claim 1, wherein the latch plate member is mounted with the latch plate opening in spaced relation to an outside surface of the luggage piece.

7. A luggage system comprising a luggage piece having a dolly connector unit fixably located thereon; and a dolly, the dolly comprising:

(a) a movable base, a platform fixably located relative to the base;

(b) a handle member fixably locatable relative to the base for manipulation thereof;

(c) a luggage connector unit supported relative to the base, the luggage connector unit being selectively coupleable with the dolly connector unit for fixably holding the luggage piece on the dolly;

(d) a pair of axially spaced wheels rotatably mounted relative to the base for rolling the dolly over a roadway surface;

(e) a handle frame connected between the base and the handle, the luggage connector unit being connected to the handle frame, the handle frame comprising a plurality of telescoping members for selectively locating the handle between an extended position and a retracted position relative to the base, the telescoping members forming a parallel spaced pair of frame columns, the luggage connector being connected between corresponding members of each column; and (f) a support member fixably locatable relative to the bases (g) a latch holder for releasably fixably holding the luggage connector on at least one of the column members, the latch holder comprising a pair of arm members pivotally connected to a latch frame, each arm member having a grip element for contacting a respective one of the column members, and a handle portion for moving the grip element away from the column member in response to finger pressure, a spring element being connected between the arm member and the frame for biasing the grip element against the column member, the dolly having a rest position wherein the platform is disposed in fixed relation parallel to the roadway surface with the wheels and the support member contacting the roadway surface, the handle frame extending perpendicular to the platform, the dolly also having a transport position wherein the platform and the handle frame are together inclined relative to the rest position, the support member being raised from the roadway surface with the wheels rollably supporting the dolly, the luggage piece being supportable partly on the platform and partly by the handle frame when the connector units are coupled together.

8. The luggage system of claim 7, wherein the platform is pivotally connected to the base on a platform axis, the platform axis being located proximate the handle frame, the platform being movable between an extended position perpendicular to the handle frame and a retracted position approximately parallel to the handle frame, the support member being connected to the platform in spaced relation to the platform axis, the platform being in the extended position in the rest and transport positions of the dolly.

9. The luggage system of claim 8, wherein the support member comprises a leg member, the leg member being pivotally connected to the platform and having a deployed position perpendicular to the platform and a retracted position parallel to the platform, the leg member being in the deployed position in the rest and transport positions of the dolly, the dolly also having a storage configuration wherein the platform and the leg member are in the respective retracted positions.

10. The luggage system of claim 7, wherein the luggage connector unit is a first luggage connector and the members are first column members, the columns also including second column members extending into the first column members, the dolly further comprising a second luggage connector, the second luggage connector being connected between respective second column members of each column.

11. The luggage system of claim 10, wherein the dolly connector unit of the luggage piece is a first dolly connector for connection with the first luggage connector, the luggage piece further comprising a second dolly connector for connection to the second luggage connector.

12. The luggage system of claim 10, wherein the luggage piece is a first luggage piece, the system further comprising a second luggage piece having a counterpart of the dolly connector unit of the first luggage piece, the luggage pieces being stackable on the platform with respective ones of the dolly connector units releasably engaging the first and second luggage connectors.

13. The luggage system of claim 7, wherein the luggage piece is a selected one of a plurality of luggage pieces, at least some of the pieces having the dolly connector differently located thereon, the luggage connector being adjustably locatable relative to the platform for alignment with the dolly connector of the selected luggage piece.

14. A luggage system comprising a plurality of luggage pieces, each luggage piece having a dolly connector unit including a latch plate member fixably located thereon; and a dolly, the dolly comprising:

(a) a base having an axially spaced pair of wheels rotatably mounted thereto for engaging a roadway surface;

(b) a handle frame including a parallel spaced pair of telescoping columns of column members projecting from the base, a first pair of column members being rigidly connected to the base, a handle member being rigidly connected between respective last column members of the columns for manipulation of the dolly;

(c) a platform pivotally connected to the base on a platform axis proximate the handle frame for movement between an extended position perpendicular to the handle frame and a retracted position parallel to and proximate the handle frame, the platform having a support for contacting the roadway surface in the extended position of the platform for providing a rest position of the dolly wherein the platform is disposed in fixed relation parallel to the roadway surface with the wheels also contacting the roadway surface, the dolly also having a transport position wherein the platform and the handle frame are together inclined relative to the rest position with the support member raised from the roadway surface with the wheels rollably supporting the dolly; and (d) a luggage connector unit supported on the handle frame for engaging the dolly connector units of a selected one of the luggage pieces, the luggage connector unit comprising:

(i) a latch frame member, at least one luggage piece being supportable partly on the platform and partly by the latch frame when the connector units are coupled together;

(ii) a pair of latch members supported by the latch frame and movable between respective latching and releasing positions, each latch member having an engagement shoulder, the engagement shoulders being operative for securing the dolly connector unit of a luggage piece against the latch frame member in the latching position of the latch members; and (iii) a latch actuator for moving the latch members between the latching and releasing positions, the latch members being formed for freely entering and exiting the dolly connector unit in the releasing position of the latch members.

15. A luggage dolly for a plurality of luggage pieces, each luggage piece having a dolly connector fixably located thereon, the dolly comprising:

(a) a base having an axially spaced pair of wheels rotatably mounted thereto for engaging a roadway surface;

(b) a handle frame including a parallel spaced pair of telescoping columns of column members projecting from the base, a first pair of column members being rigidly connected to the base, a handle member being rigidly connected between respective last column members of the columns for manipulation of the dolly;

(c) a platform pivotally connected to the base on a platform axis proximate the handle frame for movement between an extended position perpendicular the handle frame and a retracted position parallel to and proximate the handle frame, the platform having a support for contacting the roadway surface in the extended position of the platform for providing a rest position of the dolly wherein the platform is disposed in fixed relation parallel to the roadway surface with the wheels also contacting the roadway surface, the dolly also having a transport position wherein the platform and the handle frame are together inclined relative to the rest position with the support member raised from the roadway surface with the wheels rollably supporting the dolly; and (d) a luggage connector unit supported on the handle frame for engaging the dolly connectors of the luggage pieces, the luggage connector unit comprising:

(i) a latch frame member, at least one luggage piece being supportable partly on the platform and partly by the latch frame when the connector units are coupled together;

(ii) a pair of latch members supported by the latch frame and movable between respective latching and releasing positions, each latch member having an engagement shoulder, the engagement shoulders being operative for securing the dolly connector of a luggage piece against the latch frame member in the latching position of the latch members; and (iii) a latch actuator for moving the latch members between the latching and releasing positions, the latch members being formed for freely entering and exiting the dolly connector unit in the releasing position of the latch members.

16. A luggage piece system including a dolly for transporting luggage pieces and having a movable base, a platform fixably located relative to the base, a handle member fixably locatable relative to the base for manipulation thereof, and a luggage connector unit fixably locatable relative to the base, the luggage connector unit comprising a latch member, and a latch frame member connected to the base, the latch member being connected to the latch frame member and movable between open and closed positions relative to the latch frame member, the luggage piece comprising: an openable container having a dolly connector unit fixably located thereon for selectively coupling with the luggage connector unit for fixably holding the luggage piece on the dolly, the dolly connector unit comprising a rigid latch plate member having a latch plate opening therein, at least a portion of the latch member being insertable into the latch plate opening during coupling of the connector units, the latch member in the open position thereof being insertable into the latch plate opening during coupling of the connector units, the latch member having a hook portion for holding the latch plate member proximate the latch frame member in the closed position of the latch member.

17. The luggage system of claim 16, wherein the latch plate member is mounted with the latch plate opening in spaced relation to an outside surface of the luggage piece.

* * * * *